US008782621B2

(12) United States Patent
Slavin et al.

(10) Patent No.: US 8,782,621 B2
(45) Date of Patent: Jul. 15, 2014

(54) DYNAMIC ARRAYS AND OVERLAYS WITH BOUNDS POLICIES

(75) Inventors: Keith R. Slavin, Beaverton, OR (US); Shane C. Hu, Beaverton, OR (US)

(73) Assignee: Micron Technology, Inc., Boise, ID (US)

( * ) Notice: Subject to any disclaimer, the term of this patent is extended or adjusted under 35 U.S.C. 154(b) by 1 day.

(21) Appl. No.: 13/615,927

(22) Filed: Sep. 14, 2012

(65) Prior Publication Data
US 2013/0007721 A1    Jan. 3, 2013

Related U.S. Application Data

(60) Division of application No. 11/421,399, filed on May 31, 2006, now Pat. No. 8,332,832, which is a continuation of application No. 09/901,806, filed on Jul. 10, 2001, now Pat. No. 7,062,761.

(51) Int. Cl.
*G06F 9/44* (2006.01)
*G06F 9/45* (2006.01)

(52) U.S. Cl.
CPC ... G06F 8/41 (2013.01); G06F 8/30 (2013.01)
USPC .......................................... 717/140; 717/106

(58) Field of Classification Search
CPC ..................................... G06F 8/30; G06F 8/41
USPC ................................................. 717/106, 140
See application file for complete search history.

(56) References Cited

U.S. PATENT DOCUMENTS

| 4,077,058 A | 2/1978 | Appell et al. |
| 5,184,320 A | 2/1993 | Dye |
| 5,249,282 A | 9/1993 | Segers |
| 5,297,270 A | 3/1994 | Olsen |
| 5,493,666 A | 2/1996 | Fitch |
| 5,526,506 A | 6/1996 | Hyatt |
| 5,537,359 A | 7/1996 | Toda |
| 5,555,379 A | 9/1996 | Silla |
| 5,586,325 A | 12/1996 | MacDonald et al. |
| 5,721,929 A * | 2/1998 | Pasquariello ............. 717/168 |

(Continued)

OTHER PUBLICATIONS

Sarawagi, S., et al., "Efficient Organization of Large Multidimensional Arrays", Proceedings of the 10th International Conference on Data Engineering, IEEE Press, (1994), 328-336.

(Continued)

*Primary Examiner* — Wei Zhen
*Assistant Examiner* — Lanny Ung
(74) *Attorney, Agent, or Firm* — Schwegman, Lundberg & Woessner, P.A.

(57) ABSTRACT

Systems and methods are provided for writing code to access data arrays. One aspect provides a method of accessing a memory array. Data is provided within a one-dimensional array of allocated memory. A dimensional dynamic overlay is declared from within a block of statements, and the declaration initializes various attributes within an array attribute storage object. The data is accessed from within the block of statements as a dimensional indexed array using the array attribute storage object. Another aspect provides a method of creating and accessing a dimensional dynamic array. A dimensional dynamic array is declared from within a block of statements, and memory storage for the array is dynamically allocated. A dynamic overlay storage object is also provided and its attributes are initialized from the dynamic array declaration. The data is accessed as a dimensional indexed array from within the block of statements using the array attribute storage object.

20 Claims, 3 Drawing Sheets

(56) References Cited

U.S. PATENT DOCUMENTS

| | | | |
|---|---|---|---|
| 5,745,748 A * | 4/1998 | Ahmad et al. ............ 709/217 |
| 5,751,996 A | 5/1998 | Glew et al. |
| 5,761,477 A | 6/1998 | Wahbe et al. |
| 5,829,026 A | 10/1998 | Leung et al. |
| 5,898,858 A | 4/1999 | Gillespie |
| 6,002,410 A | 12/1999 | Battle |
| 6,014,723 A | 1/2000 | Tremblay et al. |
| 6,047,363 A | 4/2000 | Lewchuk |
| 6,138,209 A | 10/2000 | Krolak et al. |
| 6,145,057 A | 11/2000 | Arimilli et al. |
| 6,157,981 A | 12/2000 | Blaner et al. |
| 6,185,673 B1 | 2/2001 | Dewan |
| 6,199,173 B1 | 3/2001 | Johnson et al. |
| 6,219,725 B1 | 4/2001 | Diehl et al. |
| 6,240,499 B1 | 5/2001 | Spencer |
| 6,279,152 B1 | 8/2001 | Aoki et al. |
| 6,282,583 B1 | 8/2001 | Pincus et al. |
| 6,288,923 B1 | 9/2001 | Sakamoto |
| 6,343,375 B1 | 1/2002 | Gupta et al. |
| 6,430,656 B1 | 8/2002 | Arimilli et al. |
| 6,665,775 B1 | 12/2003 | Maiyuran et al. |
| 6,665,864 B1 | 12/2003 | Kawahito et al. |
| 6,675,253 B1 | 1/2004 | Brinkmann, Jr. et al. |
| 6,721,760 B1 | 4/2004 | Ono et al. |
| 6,826,669 B1 | 11/2004 | Le et al. |
| 7,062,761 B2 | 6/2006 | Slavin et al. |
| 7,114,034 B2 | 9/2006 | Hu et al. |
| 7,127,559 B2 | 10/2006 | Hu et al. |
| 7,577,790 B2 | 8/2009 | Hu et al. |
| 2002/0069400 A1 | 6/2002 | Miloushev et al. |
| 2002/0123981 A1 | 9/2002 | Baba et al. |
| 2002/0144244 A1 | 10/2002 | Krishnaiyer et al. |
| 2002/0169935 A1 | 11/2002 | Krick et al. |
| 2003/0014607 A1 | 1/2003 | Slavin et al. |
| 2003/0196039 A1 | 10/2003 | Chen |
| 2004/0015923 A1 | 1/2004 | Hemsing et al. |
| 2004/0205697 A1 | 10/2004 | Hylands et al. |
| 2006/0195661 A1 | 8/2006 | Hu |
| 2006/0221747 A1 | 10/2006 | Slavin et al. |

OTHER PUBLICATIONS

Verdier, C., et al., "Access and Alignment of Arrays for a Bidimensional Parallel Memory", Proceedings of the International Conference on Application Specific Array Processors, IEEE Press, (1994), 346-356.

Weinhardt, M., et al., "Memory Access Optimisation for Reconfigurable Systems", IEE Proceedings—Computers and Digital Techniques, 148, (May 2001), 105-112.

* cited by examiner

DYNAMIC ARRAYS AND OVERLAYS WITH BOUNDS POLICIES

CROSS REFERENCE TO RELATED APPLICATIONS

This application is a Divisional of, claims priority to, and is co-pending with U.S. application Ser. No. 11/421,399, filed on May 31, 2006, and which presently stands allowed, U.S. application Ser. No. 11/421,399 was a Continuation of U.S. application Ser. No. 09/901,806, filed Jul. 10, 2001, which issued as a U.S. Pat. No. 7,062,761 on Jul. 13, 2006 and which is incorporated herein by reference.

TECHNICAL FIELD

This invention relates generally to systems and methods for writing processing code to access data arrays.

BACKGROUND

Programming languages can be viewed as belonging to one of three levels: low, middle, and high. One example of a low-level programming language is assembly language, which is a mnemonic representation of machine language intended to be understandable by humans. In contrast, a high-level programming language such as Java uses syntax and concepts that more closely align with human reasoning. A high-level programming language also provides high levels of run-time access security and memory protection at the expense of some program execution speed. "Mid-level" programming languages, as used herein, have some of the "look and feel" of high-level programming languages in that, in comparison to low level languages, they appear and read in a fashion more similar to ordinary human reasoning. Mid-level programming languages allow a programmer to directly manipulate and access memory addresses, and as such, they are more computationally efficient than high level languages. In other words, for improved execution speed, mid-level programming languages omit the run-time memory access checks that a high level language might perform. Such languages may also allow direct access to memory for driving hardware devices that have control registers at fixed addresses. However, mid-level programming languages allow a program to access an illegal memory address, and as such, are often dangerous. The illegal memory accesses sometimes occur without the detection of any error at the time. Potential consequences include subsequent unpredictable behavior, and accumulated errors that result in an illegal operation and the termination of the program.

Examples of mid-level programming languages are C and C++. The version of the C language familiar to most C programmers at present is the ANSI 1989 C programming language referred herein as C89, that has the mid-level features discussed above. C++ is an object-oriented version of C89. As used herein, the term C99 refers to the publication: International Standard ISO/IEC 9899:1999(E) Programming Languages—C. As an improvement on the C89 standard, the C99 standard is used throughout this specification to illustrate examples of the possible logical mistakes, dangers, and limitations associated with mid-level programming languages, particularly with respect to the way in which mid-level programming languages handle arrays.

Since this application includes programming terms, some of these terms are introduced and defined below. These definitions are intended to assist the reader with understanding the description contained herein. Unless otherwise stated, these definitions are not intended to override the ordinary meaning that one of ordinary skill in the art would give them upon reading this description and the appended claims.

A language is defined by a grammar, such as the rules that define good sentence structures in spoken languages. Programming languages are used to express a program as text—usually contained in files. Files can be translated into low-level machine code or assembler for a target computer type by a computer program called a compiler. A cross compiler is a compiler that runs on one computer and produces machine code targeted for a different type of computer. A native compiler runs on the target computer or a computer of the same type. The resulting low-level machine code is placed in an executable file. The file can be loaded into memory to run on the target computer.

A compiler will not compile programs that do not comply with its grammar, which is the basis for programming language definitions. Some aspects of a programming language are lexical or word-based. For example, certain keywords are used to express certain language ideas and instructions, similar to verbs. Special characters or character groupings like '=' or '+=' or ';' have properties similar to keywords. Identifiers are similar to nouns, and can take any alphanumeric name, excluding spaces, which allows complicated names to be used.

When defining the syntax of a grammar, the use of angle brackets like <numeric_expression> or <file_name> for example, indicates any text that matches the named type. Comments appear after //, and remain comments until the end of the line of text. A simple syntax is defined by the following example:

<variable_identifier>=<numeric_expression>; // assign value to variable Variable names are types of identifiers that can hold values. For example, the syntax above matches only the first two lines of text below:

| | |
|---|---|
| my_value = 1 + 3; | // match: left side is variable, right is numeric constant |
| counter = 4.3; | // match as above |
| a + b = 3; | // no match as a + b is not an identifier. |

The compiler itself can perform some compile-time calculations on a program, such as evaluating constant numeric expressions. Other calculations depend on input to the compiled program when it is running. These calculations are run-time calculations, which are performed when the compiled program is running on a computer.

An array is an arrangement of information in one or more dimensions, such as a 1-dimensional list, or a color component of a 2-dimensional image. Multi-dimensional arrays are those with two dimensions or higher. The individual data items in the array are called elements. All elements in the array are of the same data type; and therefore all elements in the array are also the same size. The array elements are often stored contiguously in the computer's memory, and the subscript or index of the first element is normally zero in all the dimensions applied to the array. The array name, the element data type, the number of array dimensions, and the size of each dimension are all declared in some manner. Each occurrence of the array name in a program is an array identifier. The element data type also can yield the element size.

A pointer is a reference to an address in the computer memory. De-referencing a pointer provides access to the data in the memory that it points to, either to read the memory data, or over-write it with new data. An array identifier contains a pointer to the base address of the array in memory. The base address is the memory address of the first element in the array.

Processors are used in many different environments. For example, processors are used to perform the central processing tasks in a general-purpose computer, and are used to perform the more dedicated processing tasks of a device embedded in an appliance. A processor is a device that is programmed to execute a sequence of machine instructions stored in memory. Two characteristics that distinguish processors include the set of tasks they are expected to perform, and the speed at which they execute the tasks.

Digital Signal Processing (DSP) is a common term used to describe algorithms or special sequences of arithmetic operations on data to perform various functions. This data is usually represented in arrays. Typical examples include motion estimation, data compression and decompression, filtering, and re-sampling. DSP tasks are relatively easily described in a software program that is compiled to run on a processor. In comparison to a dedicated hardware design, processors provide flexibility as they facilitate algorithm changes.

In most DSP applications, the size of arrays can only be established at run-time. The C89 standard does not support run-time variable-length multi-dimensional arrays, making DSP coding difficult in the C language. The C99 standard addresses this shortcoming by including support for variable-length automatic arrays. C99 also includes the ability to declare arrays anywhere in the code, and to declare arrays of any number of dimensions and size, using expressions for each dimension that can be evaluated at run-time. The compiler generates machine code to allocate memory to store array elements before the elements are accessed. At the machine level, memory allocation usually occurs in units of bytes. A byte is the smallest processor-addressable unit in memory, which usually is 8 bits. The amount of memory allocated in bytes is equal to the total number of array elements multiplied by the element size in bytes. The compiler must also generate machine code to allow array element access, so that a processor can read or write data into array elements.

Subroutines are, as their name suggests, routines or functions that are called from another routine. A routine often calls subroutines to reduce its own complexity and enhance its effectiveness. In fact, almost all routines are called, and they are therefore subroutines too. Useful subroutines tend to encapsulate or embody a useful programming concept into a single re-usable block of code. Subroutines can be designed to be re-usable in many different situations, and they may be called from many different places.

Automatic storage is declared storage that is only available after its declaration, and only within the scope of a block of statements in which it is declared. The storage is released when code execution leaves the block.

The heap represents a pool of available memory that is usable by programs running on a computer. Subroutines are used in C to dynamically allocate a contiguous region of memory and free it after it is no longer needed. For example, C code syntax such as:

```
<identifier> = malloc(<nr_of_items_requested> *
sizeof(<element_type>))
and
    free(<identifier>)
``` is often used. The sizeof(<element_type>) expression obtains the size of each array element in bytes from the element type. The malloc( ) function requests memory in byte quantities at run-time. The malloc( ) return value is a pointer to the allocated memory base address. This value is stored for use as a handle to the allocated memory. The memory is dynamically allocated. In other words, at run-time, an amount of memory is requested and then allocated. A handle is a value that can be used to selectively access an object as a whole (in this case, the object is the allocated memory). A handle is usually a pointer into memory that is used to select an object as a whole. In this case, the handle can be given to free( ) to free the dynamically allocated memory resource. In C, this value is also a pointer, but given its other role, it is preferable that a handle should not be modified using pointer arithmetic. The handle value could be modified and restored, but this practice is dangerous in mid-level languages, and not even allowed in high level languages.

The new C99 standard provides variable length array support so that as far as the programmer is concerned, the malloc( ) and free( ) calls are not explicitly required for dynamically allocated array element storage. This is very different from the C89 standard which required these functions for variable sized arrays. For example, in C99, a two-dimensional array can be declared using:

<element_type><array_identifier>[<height_expr>]
[<width_expr>]

wherein <width_expr> or <height_expr> use expressions that must each evaluate to an integer at run-time. The underlying implementation of array element storage allocation in variable length arrays by the C99 compiler is not defined. Array element storage allocation in a typical compiler may therefore use the malloc( ) and free( ) functions, as these functions are generic and commonly available. A C99 variable length array declaration can occur anywhere within a block of program statements in a subroutine prior to use. The scope of the array is automatic, i.e. array access is limited to within the block of statements in which it is declared. For example, array element writes to the two-dimensional array declared above can use assignment statement syntax of the form:

<array_identifier>[<row_index>][<column_index>]=
<expression>.

Array elements can also be read as a value in expressions.

By convention, major dimensions represent array sizes or access indices in higher dimensions. The most major dimension is represented as the left-most term in square brackets following an array identifier. In contrast, minor dimensions represent lower-dimensional array sizes or access indices to the right. The <row_index> is major in the array access expression above, and the column index is minor. In the C language, according to the two-dimensional array declaration and access above, the values of <row_index> should be in the inclusive range 0 to <height_expr>−1, i.e. the most major index should comply with the size of the corresponding most major dimension size in the array, and so on down the more minor indices. If the number of indices applied to an array exceeds the declared array dimensionality then the remaining "unused" indices are applied to the array element by the compiler. This implies that the array elements must be arrays themselves in this case. If not (that is, all the indices cannot be used up), then there is a programming error. If the number of indices is less than the declared dimensionality, then the elements are arrays themselves, with sizes corresponding to the remaining unused declared minor sizes.

In hardware, memory is accessed as one-dimensional contiguous storage that is indexed by the memory address. In C, a base address is provided for an allocated region of memory, and then one-dimensional array access can be achieved by adding an index offset (scaled by the array element size) to the base address. If the base address is a memory pointer referenced by an array identifier in the C code, and if the type of data pointed to by the pointer is declared as the array element type, then the size of the elements are known at compile time. This allows the compiler to generate machine code to allow array elements to be accessed using a one-dimensional index without knowing anything about the size of the array.

An array base address passed down to a subroutine may actually have various attributes, such as its base address, and the number and size of its dimensions. The C99 standard treats array references as base addresses, so a compiler only knows about array attributes from their declarations within the scope of a block. In the C language, each subroutine can be separately compiled, so if a subroutine calls another and passes an array reference, a simple base address cannot contain array attribute information. The C language allows the definition and use of structures, which are aggregates of data. Members of the structure are accessed using the syntax <structure_reference>→<member>. Structures can be defined to include array attribute information, but only a reference to a member of a structure can obtain the array base address. For example, array→base_address[row][column] can be indexed. This syntax is cumbersome.

C99 declared arrays are either implemented as arrays of arrays, or by using index mapping expressions. In either case, multi-dimensional array access is slow. The array-of-arrays implementation uses a one-dimensional array to store references to other base addresses of sub-arrays in memory. Each sub-array may contain references to other arrays, etc. The number of array dimensions defines the number of one-dimensional array accesses required to obtain the desired array element. The index mapping approach performs calculations on sets of indices to map them onto an equivalent single index used to access an element from the one-dimensional array memory. In this case, an additional multiply is required for each additional array dimension.

To improve the execution speed of compiled C programs (or any mid-level programming language), index ranges are not automatically checked at compile-time or run-time. If out-of-bounds array indices are used, the underlying array access mechanism may access memory outside that allocated for the array, possibly causing a running program to terminate.

Many C programmers try to improve program speed in C by recognizing that for many algorithms, array elements are often accessed sequentially. Therefore memory access patterns such as: write to A[0][0], write to A[0][1], write to A[0][2] . . . are common. Programmers may write code to avoid indexing altogether, and instead use pointer arithmetic. For example, the code A[0]=1; A[1]=2; A[2]=3; . . . can be replaced by A[0]=1; A=A+1; A[0]=2; A=A+1; A[0]=3; A=A+1; etc. In other words, the memory pointed to by A is repeatedly written to, and then the pointer A itself is changed. The cumulative changes to the pointer A must be correct for the code to operate correctly, otherwise A may point outside of the original array bounds.

Since execution speed is important within a DSP environment, mid-level languages like C are often used with pointer arithmetic. The result is code that is complex and fragile, as it relies on the correct accumulation of address calculations throughout the entire program. Also, using pointer arithmetic makes programs harder to understand and maintain, because valid pointer de-referencing depends on correct prior address calculations. These calculations could be spread out in the program, so they have to be understood over a large scope before each instance of a de-reference can be understood.

Many programmers have to deal with legacy code. They may have to write new code to replace a lower level subroutine, and deal with pointers to arrays as inputs to the subroutine. It would be helpful if the programmer could access the memory as an array, rather than using pointer arithmetic. The C99 standard supports declaring a variable size array input to a subroutine, but it does not support the use of general expressions for array sizes within declarations. In many situations, legacy code may pass down an array base address, and other array information that is used by a subroutine to perform various array-based tasks. There is a requirement to be able to access this data using an array view based on calculations on the passed parameters. The C99 standard allows an array declaration within a subroutine declaration, and the number and size of array dimensions can be a direct function of the input parameters. However, insertion of non-trivial code in a declaration is not possible, thus limiting its use. In addition, as there is no way to release the view and impose new views within the scope of the subroutine.

Many DSP applications generate an output image based on a source or input image. Information outside of the bounds of the input image is often required to properly generate the output image. For example, digital filters may take several input array elements to generate an output array element. The input elements used are usually clustered around the output element if one visualizes the input and output arrays as superimposed images.

If an output element is at the edge of the output array, then input elements needed to calculate its value may lie beyond the edge of the input array. DSP programmers make decisions about how to treat out-of-bounds indexing, but then they write obscure code to control the behavior of their program at the edges of the source or input image. The intentions of boundary handling code are often not explicit, and the code tends to be very complex and error-prone, particularly when pointer arithmetic and multi-dimensional arrays are being used together.

Therefore, there is a need in the art to provide a system and method that overcomes these problems by including language features that allow programmers to use array indexing schemes instead of pointer arithmetic in both new and legacy code, and allowing the programmer to simply and explicitly specify array access behavior for invalid array access indices.

DETAILED DESCRIPTION

Figure 1:
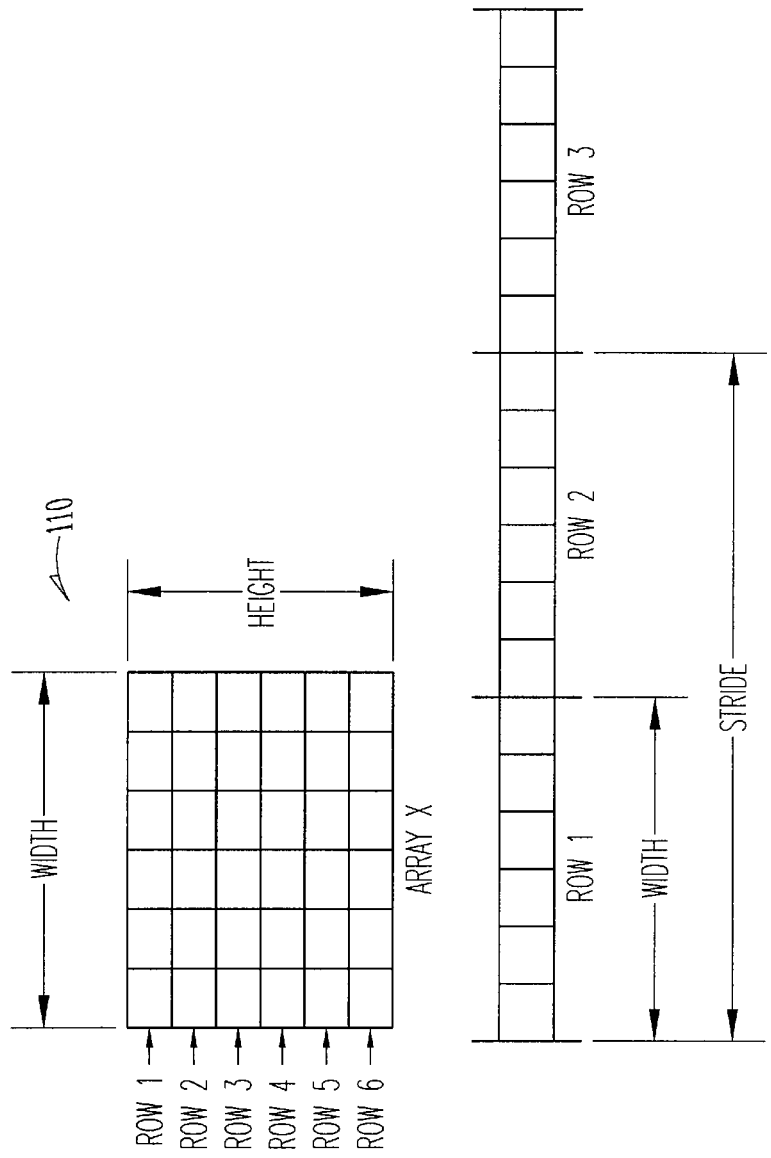
FIG. 1 illustrates a two-dimensional array stored in a one-dimensional memory, and illustrates width, height and stride attributes for two-dimensional arrays in an interlaced video processing illustration in which the stride is twice the width.

The following detailed description of the invention refers to the accompanying drawings that show, by way of illustration, specific aspects and embodiments in which the invention may be practiced. In the drawings, like numerals describe substantially similar components throughout the several views. These embodiments are described in sufficient detail to enable those skilled in the art to practice the invention. Other embodiments may be utilized and structural, logical, and electrical changes may be made without departing from the scope of the present invention. The following detailed description is, therefore, not to be taken in a limiting sense, and the scope of the present invention is defined only by the appended claims, along with the full scope of equivalents to which such claims are entitled.

The invention provides a simple user interface for the most common array access problems, such as those encountered in developing source code for DSP applications. The invention provides an effective method for accessing dynamically allocated memory using indices, and simplifying code to handle invalid indices.

A dynamic overlay provides a method for overlaying a dimensional structure or view on a contiguous memory region starting at a provided base address pointer. The pointer must be a valid reference to within a currently allocated or safely accessible memory region. According to one embodiment, the overlay is declared with the base address, and the array dimensionality and size of the desired view on the allocated memory. The declaration can express array size in terms of expressions that are evaluated at run-time so that programmers have complete control of the view on the data appropriate to their problem. To allow this, the overlay declaration can occur anywhere in the code before the array is to be accessed. Dynamic overlays can be applied to any type of safely accessible memory such as allocated dynamic, automatic, or static types. In a preferred embodiment, the overlay resource behaves like automatic storage because the resource is freed when leaving the body of statements in which it is declared. A new overlay on existing data can be provided by either allowing changes on the dimensionality of an overlay, or in a preferred embodiment, by freeing the overlay resource, and creating a new overlay with the desired view.

A dynamic array combines dynamic allocation of memory with a dynamic overlay. Dynamic array declaration and dynamic array access syntax can be similar to the C99 standard for variable length arrays. One difference is that a handle to a set of dynamic overlay attributes is passed down to subroutines, instead of an array base address, and that these array attributes are then available to the called subroutine. This difference may require minor differences in the array declaration syntax in order to allow the compiler to support both dynamic arrays and the C99 variable length arrays. At run-time, an amount of memory is dynamically allocated that is sufficient to hold the declared array size. In addition, an overlay resource handle is selected and initialized. The dynamic overlay mechanism is then used to enable array access. Both the allocated memory and the overlay object are freed after leaving the subroutine or body of statements in which the dynamic array is declared.

One aspect provides a method of accessing a memory array. Data is provided within a region of memory starting at a base address. A dynamic overlay is declared on the data within a software subroutine or block of statements. The dynamic overlay declaration specifies the number and size of dimensions of the overlay view on the data. The data is then accessed as array elements from within the subroutine or block of statements. The program is then compiled and executed. At run-time, the dynamic overlay declaration causes both a dynamic overlay storage object, and a handle to this object to be provided. The dynamic overlay storage object attributes are initialized from the dynamic overlay declaration. The data is then accessed from within the subroutine or block of statements as an indexed array of elements using the handle and the dynamic overlay object attributes. The dynamic overlay storage object is automatically freed after leaving the block of statements in which the dynamic overlay was declared.

Another aspect provides a method of creating and accessing a dynamic array. A dynamic array is declared within a software subroutine or block of statements. The dynamic array declaration specifies the number and size of the array dimensions. The array elements are then accessed from within a software program block of statements. The program is then compiled and executed. At run-time, sufficient memory storage is dynamically allocated to store all the elements in the declared dynamic array. A dynamic overlay storage object is provided with attributes assigned from the dynamic array declaration. Dynamic array elements are then accessed from within the subroutine or block of statements using the handle and array indices. The array handle provides access to the dynamic overlay object attributes which are then used to facilitate array access. The dynamic overlay storage object and the dynamically allocated memory are both automatically freed after leaving the subroutine or block of statements in which the dynamic array was declared.

Another aspect provides a system, including a computer readable medium, an extended programming language encoded in the medium, and a compiler. The extended programming language includes dynamic array language extensions and dynamic overlay language extensions. The dynamic array language extensions are used to declare a dynamic array and an identifier for accessing the dynamic array elements using indices. The dynamic overlay language extensions are used to declare a dynamic overlay on existing data and create an identifier for accessing the data as array elements using indices. The attributes of dynamic overlays and dynamic arrays are also made available in the language extensions. The compiler converts the extended programming language into machine code instructions that are able to run on a target processor.

According to one embodiment, array boundary policies are applied to both dynamic overlays and dynamic arrays. Boundary policies allow the programmer to extend each declaration to define a policy for re-mapping out-of-bounds indices back to in-bounds indices. This process is called boundary policy enforcement. The index policies can be described in a natural way to, for example, reflect the array at a boundary, extend the array boundary values out to infinity, or surround the array with a constant level outside. Such policies reflect conscious decisions that algorithm developers and programmers make to improve the performance of their algorithms. Conventionally, programmers do not explicitly declare their boundary policies, but rather often write difficult and convoluted code to achieve correct behavior at array boundaries.

Boundary policies can provide memory protection for dynamic arrays because the memory allocation and overlay are defined together such that boundary policy enforcement always ensures valid memory access. Boundary policy enforcement occurs independently for each index. In contrast, an invalid index applied to a conventional index mapping expression may still result in a valid memory access. In the case of dynamic overlays, boundary policy enforcement protects memory accesses if the view lies within valid allocated memory. As the programmer specifies the dynamic overlay independently of memory allocation, the intent of array overlays is to facilitate array access, and not to provide invalid memory access protection.

In one embodiment, dynamic array or dynamic overlay extensions are provided. One embodiment of the dynamic array extension creates a dynamic overlay data structure, and a handle for it. This data structure includes another handle onto memory that is dynamically allocated, as well as array information with which index mapping and boundary policy calculations are made. According to one embodiment, the array information comprises the array height, array width, and array boundary policy. In one embodiment, a two-dimensional index mapping can be overlaid upon a contiguous one-dimensional array of contiguous data. In one embodiment, special hardware is included to regain the performance of array access calculations.

There are several aspects associated with the invention that combine in such a way as to allow simplification of DSP source code, while also showing that with a few special additional processor machine-code instructions, the compiled code can run faster than C code using address arithmetic.

The term "dynamic array" is used to describe a combination of run-time dynamic allocation and a dynamic overlay array access mechanism. It is noted that others have defined "dynamic arrays" as arrays that appear to automatically increase their size to accommodate any hither-to out-of-bounds index used to access an array. In fact, some "weakly typed" computer languages like Perl support only this type of dynamic resizing of arrays rather than using any form of strongly typed array declaration. This type of programming specification leads to undetected program indexing errors, and is not useful in DSP code where the dimensional organization of the input array data is known. The term "dynamic array" is not used herein to define dynamically resizable arrays; but rather, as stated above, is used to describe the combination of a run-time dynamic allocation and dynamic overlay array access mechanism.

One aspect provides a method for writing simpler array processing code using dynamic arrays, dynamic overlays, and array indices instead of pointer arithmetic. As DSP programming often requires the fastest possible system performance, the only way programmers will abandon using pointer arithmetic is by speeding up array index access using a modified processor with dedicated dynamic overlay machine-code instructions and support hardware. In one implementation, some simple extensions to the C language standard are proposed.

The following code is an example showing the use of dynamic array extensions to the C language:

```
int Find_Sum(int n, int m)
    {
        // DYN_ARRAY prefix tells compiler that this declaration
        // is different from C99 variable length arrays
        DYN_ARRAY int arry[n][m];
        // pass arry as pointer to cda_array structure with attributes
        return(Sum2d(arry));
    }
int Sum2d(dyn_array *arry) // dyn_array is the array attribute structure
type
    {
        int row, col, sum;
        // don't allow indexing outside the array
        arry->boundary_policy =
        ABORT_OUTSIDE_BOUNDARY;
        sum = 0;
        // height and width are attributes of 2-d dynamic array
        // so systematically read the entire input array using loops
        for(row = 0; row < arry->height; ++row)
            for(col = 0; col < arry->width; ++col)
                sum += arry[row][col]; // sum all
                array elements
        return(sum);
    }
```

According to one embodiment, the arry reference used above is a handle to an aggregate storage structure that contains attribute values including "boundary_policy", "width", and "height". The array attributes are used directly in the second subroutine, making the code easier to read and maintain.

According to one embodiment, the arry handle is also accessed as both a structure and as an array in the sum loop as array[row][col], something that the C99 grammar does not allow. In the C99 language, the array width and height have to be passed as separate parameters in the function call, with more likelihood of programmer error.

For true multi-dimensional support, an array attribute can reference a one-dimensional array of sizes for the required number of array dimensions. In practice, higher dimensional arrays are rare in code, so it may be practical to set an upper limit in the dimensionality supported with dynamic overlays. In one embodiment, for up to three declared array dimensions, a program can access array attribute using names like "width" (for the minor dimension), "height" (for two or three-dimensional support), and "depth" (for three-dimensional support only) to describe the array dimension sizes. A fixed limit on the number of dimensions also allows dedicated fast hardware storage to be used for dynamic overlay attributes.

At compile time, the array element type and element size attributes are known. According to one embodiment, the array element storage memory size is dynamically calculated and allocated at run-time, and the returned base address value is copied into the dynamic overlay structure's base address attribute.

According to one embodiment, the compiler protects array attributes set from an array declaration from being overwritten. Protected attributes include the base address, dimensionality, array dimension sizes, and element size.

According to one embodiment, dynamic arrays are given an additional attribute called an array boundary policy. This policy states what should occur if an out-of-bounds array access occurs. Most DSP algorithms take several array input elements to support and generate each output array element. This means that code is usually written to systematically fill an output array based on its declared size. The algorithm then calculates what input elements it needs based on the output element on which it is currently working. When working on generating some output elements near the output array boundary, this behavior could require supporting elements from the input array that are beyond its boundary. Therefore, array reads naturally go out of bounds, and array writes usually do not. Conventionally, programmers go to great lengths to detect invalid array read accesses and suppress them by modifying their algorithms to make some sort of assumption on how to 'fill in' the missing values based on the available input array values. This conventional boundary code is often messy and error prone, and is potentially slow. The present subject matter allows a programmer to explicitly state the behavior required using the array boundary policy attribute rather than writing special boundary code.

A boundary policy attribute assigned to an array results in run-time boundary policy enforcement on the array indices used for array element access. In the simple example above, the algorithm reads all the input array elements systematically, so an out-of-bounds read access is not acceptable, and it is appropriate to abort the program for array element access outside the array boundary.

Only two boundary policies make sense when writing an array element to an index outside of the ranges permitted by the array declaration; either the element is not written, or the program is aborted to signal an out-of-bounds error. The former is useful if an algorithm works in fixed size sub-blocks that do not align with the output array boundaries. The possibilities for array element reads are much richer in scope. Potential read policies include: abort if outside the boundary; surround the array with a constant value outside the boundary; independently clip each applied index to its declared boundary range and read the array element at the clipped index value; and perform odd or even reflection of the array at its boundaries. As a reflection example, a two-dimensional image array 'any' is defined with its top left element at arry [0][0], its minor index selects an image column, and its major index selects an image row. Indexing beyond the left boundary of the image to element arry[0][−1] can be odd-reflected to arry[0][1]. For odd reflection policies, the pixels at the reflection boundary appear only once (i.e., arry[0][0] reflects to the same arry[0][0]). An even reflection would duplicate the boundary elements, so arry[0][−1] reflects to arry[0][0], and arry[0][−2] reflects to arry[0][1], etc. For simplicity, an extreme index reflection that extends beyond the opposite side of an array is limited to the far edge index.

For dynamic arrays, attribute write protection combined with boundary policy enforcement gives array access protection. For one-dimensional arrays, this protection is similar to the run-time checking provided in languages such as Java.

The differences between dynamic arrays and C99 variable length arrays require different compiler handling. The DYN_ARRAY prefix is added to help the compiler generate the appropriate machine code in each case. In some restricted situations, a compiler could implement C99 variable length arrays using dynamic arrays.

According to one embodiment, a boundary policy is specified independently for each dynamic overlay structure. The policy selected is that which is most appropriate for the algorithm that is operating on the array at the time. Therefore, according to this embodiment, the boundary policy is not a protected attribute. Different algorithms may be applied to the same set of array data, which may require the array to have different boundary policies set for each algorithm stage. To allow the policy to be changed during program execution, it is preferable that an array boundary policy is set as an attribute, and not as part of an array declaration.

Dynamic array handles passed into a subroutine or function must be declared in function prototypes as having a special type. In the example above, the second subroutine includes the special dyn_array type within its declaration:

dyn_array*arry.

The compiler is then able to generate the correct array indexing instructions. The dyn_array handles that are passed into subroutines cannot be overlaid, freed or otherwise manipulated inside the subroutine. They can only be used for indexed array access, unprotected attribute changes, or as references to be passed down further into other subroutines.

A dynamic array declaration defines an array with attributes that do not normally need to be changed after the declaration. The dynamic array represents a "scratch-pad" array that can be used within a block of statements and then discarded when leaving the block, similar to automatic variable-length arrays in C99. In the case where memory is allocated and packed with multi-dimensional data, and the memory base address is passed elsewhere (into a subroutine for example), one needs to be able to impose an array access view on pre-existing data, rather than create a new array. A dynamic overlay can provide a view on existing data. This feature is partly available in C99 by declaring the dimensionality of the array at the subroutine input as a function of other input parameters. The problem with C99 is that overlaying a view is limited by the code executable inside a subroutine declaration. Furthermore, the scope of the C99 subroutine does not allow multiple overlays to be dynamically created and destroyed, as may be required within a loop for example.

If an existing memory reference identifier is used in the overlay declaration, then the overlay declaration can either specify a dynamic overlay handle with a new name, or if this is not provided, the compiler can usurp the array name. For example in 2 dimensions, usurpation can be declared using syntax like:

DYN_OVERLAY <array_reference>[<height>][<width>].

The <array_reference> must already have been defined as a pointer; otherwise there is no reference to usurp. Usurping names allows the use of dynamic overlay declarations to be very similar to dynamic array declarations, except that the element type is taken from the element type pointed to by the usurped memory reference. If the array name is usurped, then all subsequent array access code applied to the array reference in a program is compiled to use the dynamic overlay array access mechanism with the dynamic array handle, rather than compiled for normal C array access. When program control flow exits the statement block in which the overlay is declared, then the base address reference is no longer usurped and the compiler allows the array reference to be used as a base address or pointer in a conventional C manner. As the overlay is no longer used, the corresponding overlay resource is freed after its last use. The overlay resource is then available for new dynamic array or dynamic overlay declarations subsequently created at run-time. The memory pointed to by the base address attribute is not freed, because, unlike the dynamic array case, it is not known if this pointer is a handle. Instead, the base address may be from static or automatically allocated memory, or derived using pointer arithmetic.

The present invention is illustrated by way of an example of a dynamic array program disclosed in Tables 1, 2 and 3. As the scope of the present invention is defined by the appended claims and the full scope of equivalents to which such claims are entitled, the following example disclosed in Tables 1, 2 and 3 and in the supporting description should not be read to limit the present invention.

Referring to Table 1, the DYN_OVERLAY prefix is used in front of the first declaration, instead of DYN_ARRAY. In both types of declaration prefixes, multiple arrays of the same element type can be declared in the same line.

To explain the compilation process, the Filter( ) function of Table 1 is first compiled into conventional C89 code, using added functions that are called to implement the required array creation, array access and array freeing mechanisms. The added functions can be implemented by those skilled in programming art after reading the description of the current invention. The compilation stage uses a compiler program to recognize the C with extensions, and generate a standard C output file, as in Table 2 for example. The C code of Table 2 can be compiled with the added functions to run on a target processor. In one embodiment, the compiler compiles directly from the C with extensions to machine code for the target processor, using techniques well known in compiler art. The result is that the compiled program executes relatively slowly. If special hardware with new machine instructions is available, then the compiler can replace the added function calls with relatively few instructions that can execute much more rapidly. The nature of the special hardware is described later. In other embodiments, the extensions are modified appropriately to apply to languages other than C. This application may result in increased program execution speed when array accesses are used with the special hardware. Mid-level languages may also experience a gain in run-time robustness due to boundary policy enforcement.

The languages chosen for extension will determine the availability of compilers. The Filter( ) function is provided only as an example of extensions to the C language. One skilled in the art would be able to write other functions more appropriate to a particular problem, and expressed in their chosen language for which an extended-language compiler is available.

Referring to Table 2, function calls are used to implement some of the code expressed in Table 1. Dynamic arrays and dynamic overlays are created using Create_1d( ) and Create_2d( ) for one-dimensional and two-dimensional arrays respectively. NULL is passed as the base address reference to indicate a dynamic array declaration, so that memory is dynamically allocated inside the create functions. Overlay resources are freed using Free_Overlay( ) Arrays are accessed using get1( ) and get2( ) for one-dimensional and two-dimensional reads respectively, and put1( ) put2( ) for one-dimensional and two-dimensional array writes respectively. In the case of compiling from Table 1 to Table 2, the sequential program flow remains unchanged. The translation mostly consists of code substitutions. An exception is if Table 2 is C89 code, where declarations and executable code cannot mix. In this case, the dynamic array and dynamic overlay declarations also result in the insertion of additional separate handle declarations before the code body. For example, dyn_array*src=NULL declares and initializes a handle named src. In C99, this separation is not required. The substitutions of array access code with function calls are therefore understood by examining the differences between Table 1 and Table 2.

A dynamic array declaration results in a call to dynamically allocate memory of the declared size at run-time, and then a dynamic overlay is created over of the allocated memory. A dynamic array behaves like automatic array storage, so that when leaving the block of statements in which it is declared, both the dynamic overlay resource and the dynamically allocated memory are freed. In practice, a special function or hardware instruction is implemented and used by the compiler to free dynamic overlay resources. For example, a Free_Overlay( ) function call is used in Table 2 to free all overlay resources. The calls to dynamically allocate and free memory are encapsulated inside the calls for creating and freeing dynamic arrays and dynamic overlays. This allows any type of memory allocation mechanism to be used without changing Table 2.

If usurpation is used and the Free_Overlay( ) function is made available to the programmer, then an explicit Free_Overlay(<handle>) subroutine call requires that on all subsequent <handle> references, the compiler should correctly undo usurpation of the <handle> and re-associate all subsequent program references with the original overlaid base address.

According to one embodiment, a dynamic array declaration results in the run-time allocation of a dynamic overlay attribute storage resource and a run-time dynamic allocation (e.g., by using malloc( )) of array element storage memory, and the assignment of the memory base address to the array base-address attribute. When the dynamic overlay structure storage resource is later freed, the base address attribute is used as a handle to free the dynamically allocated memory in the appropriate manner. According to one embodiment, automatic memory allocation from the stack (e.g., using alloca( )) can dynamically allocate array element storage memory, thereby avoiding the need to explicitly free the memory.

Usurping a memory reference name can be avoided if a new reference name for the dynamic overlay can be given. For example, the following declaration syntax can be used:
DYN_OVERLAY <handle_name>[<height>][<width>]=<mem_ref_name>;
In C, two-dimensional arrays are based on so-called row-major or column-minor indexing. In two-dimensions, another useful array attribute is called the array stride. The stride gives the number of elements in the allocated memory from an element to the one above or below it in an adjacent row. The stride attribute value is used in index mapping expressions instead of the width attribute value. The width attribute value is then used exclusively for detecting boundary violations as part of the boundary policy. For a given array, the stride attribute value should be greater than or equal to the width attribute value. The stride value is now used to impose the programmer's view of how to access pre-allocated data in two-dimensional dynamic overlays. The width, height, and boundary policy attributes impose a window on that two-dimensional data view which restricts the array elements that are accessible. C99 does not support boundary policies, so only the stride value has meaning Use of the stride attribute is shown in FIG. 1, which shows a miniature 6×6 image 110 as a two-dimensional array. The data is stored in one dimension as row data packed end to end. In applications where the image is being processed as a frame of video data, all rows need to be accessed to the full width and height attribute values. In interlaced video processing, rows 1, 3, 5 belong to a video field 1, and rows 2, 4, 6 belong to field 2. In this case, the camera that captured the video data may have captured field 1 at an earlier time than field 2, so any motion would result in some objects appearing at different positions were you to view each field separately. Motion-based DSP algorithms usually work best when the image being analyzed is grabbed near one point in time, so they work best if these two fields are processed separately. Dynamic arrays can achieve this by setting the stride value equal to twice the width value, and halving the height value. That way, the array can be viewed as a 12 element wide by 3 element high image, with field 1 on the left and field 2 on the right. If the width is 6, then the dynamic array boundary policy will only allow elements from field 1 to be accessed. The boundary policy behavior will result in the elements in field 2 being completely ignored. That is, its elements will have no affect on any subsequent calculations applied to field 1. To process field 2, the width value is added to the base address to obtain an offset reference value that is then passed to the dynamic overlay declaration. If the width, height, and stride values remain unchanged, the dynamic array boundary policy will now provide protected access to field 2 in a similar manner to field 1, and using the same valid index ranges as for field 1 (i.e., 0-5 for the minor column access, 0-2 for the major row access).

If an algorithm is implemented with dynamic arrays supporting the stride attribute inside a subroutine, and the values of width, height, stride, and base address, are passed as parameters to the subroutine, then the subroutine can be instructed (e.g., through an additional subroutine parameter) to perform field 1, field 2, or frame processing. As the stride is needed to interpret an overlaid view of existing data, the stride can be part of the overlay declaration as shown by the following example of a declaration syntax:
DYN_OVERLAY <handle_name>[<height>][<width>@<stride>].
According to one embodiment, if the stride value is not explicitly set, then the stride attribute value can be set to the width attribute value by default.

For dynamic overlays, changing a view by changing width, height and stride attributes after declaration can make acceleration hardware more complex. According to one embodiment, the attributes obtained from a dynamic overlay declaration are protected as for dynamic arrays. Therefore, changing an existing overlay view on data is accomplished by explicitly freeing the overlay, and then declaring a new one.

Replacing dynamic overlays is a fast operation in hardware, as main memory allocation is not required.

Processor performance is usually substantially improved if array access can be made faster. Array indices normally slow down array access, but with dedicated processor instructions and hardware, speedups can occur if: array attributes are stored in dedicated memory ready for fast hardware access; an array handle and multiple array indices are able to be issued by the processor in dedicated array access instructions; boundary policy enforcement is performed in the memory access path from the processor; index mapping expressions are calculated in the memory access path from the processor; a fast array cache is used with slow main memory; and separate paths and caches are used for array element storage verses other data.

A summary of one embodiment of a set of extensions to the C language grammar is shown in Table 3. This embodiment demonstrates the nature and use of the extensions, and the application of those extensions to control hardware for faster array access. When using software emulation of array access hardware, statistical data for array and cache access can be extracted and summarized to help write better software.

Figure 2:
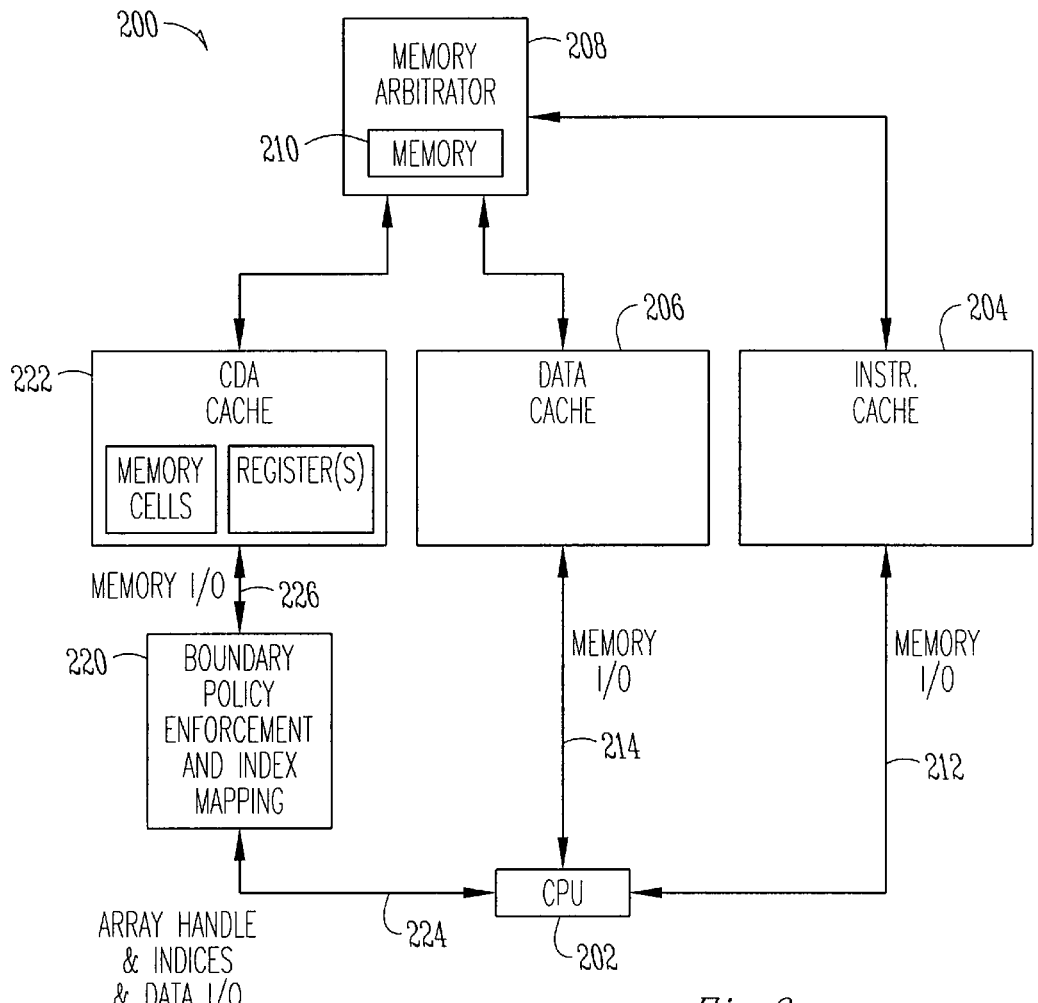
FIG. 2 is a block diagram of one embodiment of an electronic system that incorporates the present invention.

FIG. 2 is a block diagram of an electronic system 200 that incorporates the present invention. The system 200 includes a conventional arrangement of a processor 202, with an instruction cache 204, a data cache 206, main memory arbitration 208, and main memory 210. The system speeds up dynamic array and dynamic overlay array access using a boundary policy enforcement and index mapping unit 220 and a Cached Dynamic Array (CDA) cache 222. Copending U.S. application Ser. No. 09/901,811, Publication No. US-2003-0014588-A1 entitled CACHING OF DYNAMIC ARRAYS, assigned to Applicants' assignee and filed on Jul. 10, 2001, describes the dynamic array cache, and a cached dynamic array (CDA) system formed by the CDA cache and by the dynamic array and dynamic overlay code. The CDA cache 222 provides special hardware support that can be accessed through dynamic array code and an extended compiler to improve array accesses. As such, U.S. application Ser. No. 09/901,811, Publication No. US-2003-0014588-A1 is hereby incorporated by reference.

The CPU 202 is coupled to and communicates with the cache memories 204 and 206 via memory interface input/output (i/o) paths 212, and 214 respectively. The processor 202 executes dedicated instructions for generating array handle values and indices that are sent via 224 to the block 220 for array access. The block 220 translates each array handle and set of array indices into array element access memory addresses that are forwarded to the CDA cache 222. A data path from the processor 202 to the block 220 also allows programming of memory within that block 220. The block 220 is described in more detail in FIG. 3. The data path from the processor 220 is also forwarded with the array element access memory address to form a full memory interface i/o path 226 to the CDA cache 222. Based upon the instruction the processor 202 is executing at the time, the processor 202 selects the cache used in each memory transaction.

If the processor 220 requests access to data already in a cache, then the cache can rapidly return the requested data to the processor. This event is called a cache hit. Otherwise, if the cache does not have the requested data, i.e. a cache miss, then the cache takes the memory requests it receives from the processor and forwards it to the main memory. According to one embodiment, the compiler and processor instruction set separate out instruction, data, and CDA array access into memory requests from the instruction 204, data 206, and CDA caches 222 respectively. The memory arbitrator 208 resolves which cache has access to main memory 210 in the case where there are simultaneous requests for main memory access from different caches (each arising from cache misses).

Generally, cache memory such as the instruction cache memory 204, the general data cache 206, or the CDA cache 222, are each smaller, but much faster than the main memory 210. Cache memory stores a duplicate of certain data from the main memory 210. In particular, the data that was recently read from the main memory 210 has an excellent statistical chance of being read again soon after, so it is kept in the cache memory as long as possible. When a cache miss occurs, the requested data is retrieved from main memory 210, and forwarded to the processor 202. As this new data is not in the cache, the cache also updates its own local memory to store the new data in case the processor 202 needs it again soon.

Caches are considerably more complex for each bit of data storage when compared with main memory. Therefore caches are limited in size relative to main memory. When the cache is full of new data, further requests for new data will cause a cache to discard older data to make way for the new. The discarded data is then written back into the main memory.

Separating the dynamic array cache from the general program and data cache prevents regular data or instruction traffic from interrupting the contiguous nature of array data stored in the CDA cache. This separation also allows the CDA cache to take advantage of the contiguous nature of array data and speculatively load new array data into the CDA cache before it is needed. For a modest size CDA cache (e.g., 4 K Bytes), speculative loading effectively eliminates most cache misses for applications as complex as MPEG2 motion estimation, leading to very high performance, even with relatively slow main memory. This effectiveness allows DRAM (Dynamic Random Access Memory) to be used as main memory, so low-cost DSP processing systems can be built using embedded DRAM (i.e. the DRAM and the DSP processor are in the same IC). Embedded DRAM also allows very wide data busses between main memory and the CDA cache, so that parallel DSP processing can result in extremely high performance, and yet still be cost effective. Using indices for array access in programs makes it relatively simple to write compilers to generate code for CDA based parallel processing systems. In contrast, conventional C compilers and hardware do not separate out array data requests from other memory access requests, so a lot of unused data ends up being loaded, and speculative loading techniques are relatively ineffective in this case.

Figure 3:
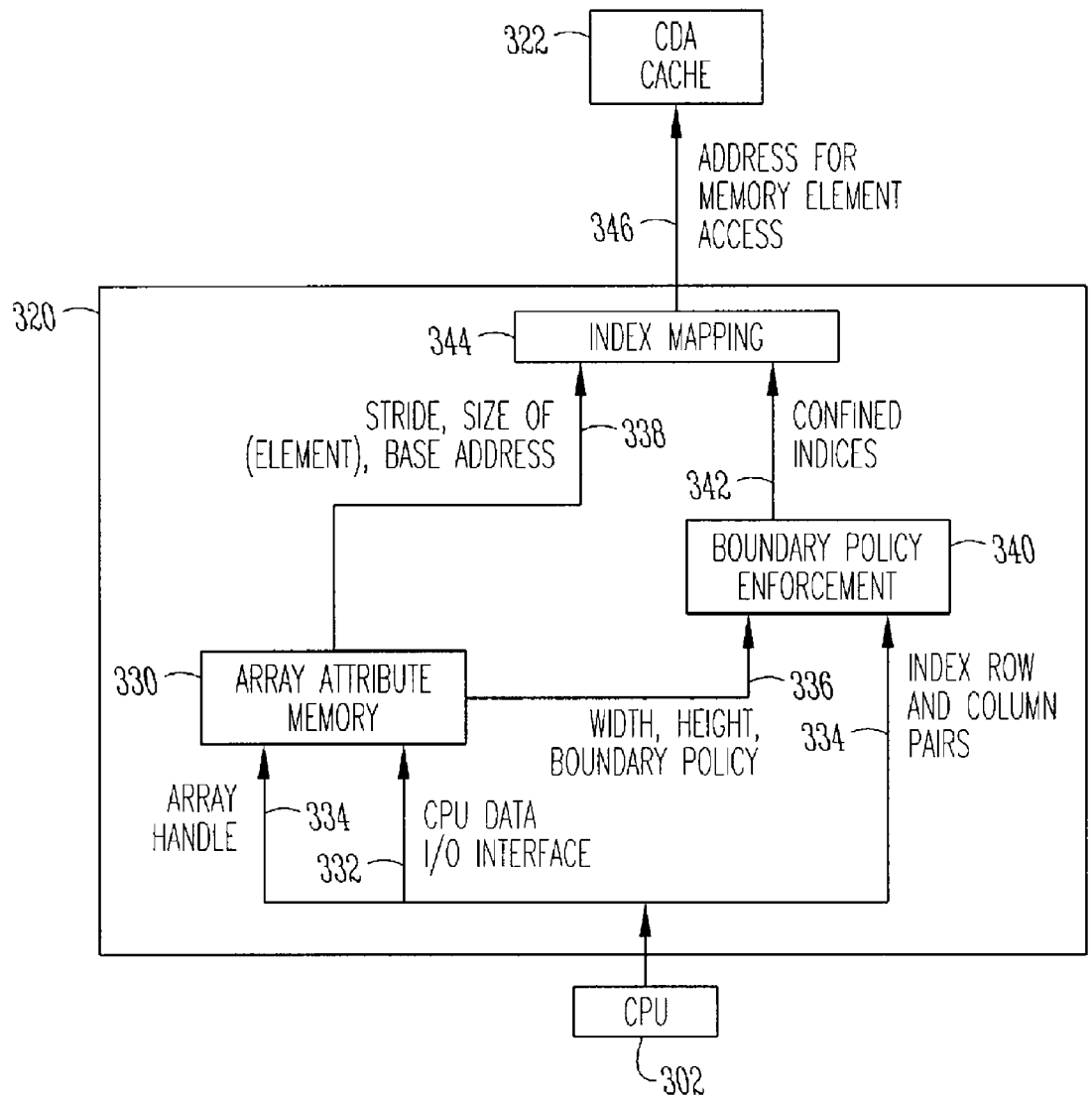
FIG. 3 is a block diagram of one embodiment of an electronic system for array access that processes an array base address and set of two-dimensional indices to obtain memory addresses for de-referencing.

FIG. 3 is a block diagram of an electronic system 300 for array access that processes an array base address and set of array indices to obtain memory addresses for array element access. FIG. 3 describes the boundary policy enforcement and index mapping block 320, previously illustrated as 220 in FIG. 2. FIG. 3 also shows the processor 302 and CDA cache 322 previously illustrated as 202 and 222 in FIG. 2. FIG. 3 shows an attribute memory 330 that contains attribute data for some maximum number of arrays. For two-dimensional array support, attributes comprise an array width, height, boundary policy, stride, element size, and memory base address. The attribute memory for each array is previously initialized from array declarations and other code via an array parameter setup port to the processor on the data i/o interface 332. The array handle input 334 is shown connected to the address input of the array attribute memory 330. An array declaration in a program causes an array handle value to be allocated through a run-time overlay handle resource allocation mechanism. When the processor executes an array access instruction to a dynamic array or dynamic overlay, the processor issues array handle values on 334, and index row and column values on input 334.

A finite number of arrays handles are simultaneously supported in hardware because of the hardware overhead required to store the attributes associated with each array handle. Therefore only a small number of control bits are needed to represent the handle selection. In one embodiment, a maximum of 32 arrays can be supported, which can be selected using 5 bits within dedicated processor array-handle-access instructions. This small number of bits frees up other processor bits within the dedicated instructions to be used for other purposes such as array index values. For example, two-dimensional array reads can be accomplished in one dedicated 32-bit processor instruction that emits two 12-bit immediate index values and the 5-bit handle value, with 3 remaining bits for instruction decoding.

When an array handle value 334 is presented to the attribute memory 330, the required set of attributes 336 and 338 are obtained as a memory lookup. The width, height and boundary policy attributes 336 are applied to the boundary policy enforcement unit 340 along with the row and column indices 334 from the processor. Based on the boundary policy attribute, a set of confined indices 342 is obtained. The confined indices 342 are forwarded to the index mapping calculation hardware 344, which also takes the stride, element size, and base address values 334 from the memory lookup 330 to calculate the element address 346. The element address 346 is forwarded to memory via the CDA cache 322, along with read/write control, data, and any other items needed for memory access.

TABLE 1

CODE EXAMPLE OF 2-D FIR FILTER USING DYNAMIC ARRAYS

```
/*
 * {1,4,6,4,1} 5-tap gaussian horizontal, {1,2,1} 3-taps gaussian
 * vertical down-sampling filter.
 * C language with dynamic array and dynamic overlay extensions.
 * Boundary policies are also used.
 * Both 'src' and 'out' arrays must be pre- allocated to w*h and
 * (w/2)*(h/2) bytes respectively.
 */
void Filter(char *src, char *out, int h, int w)
{
   int i, j, n;
   DYN_OVERLAY unsigned char src[h][w], out[h/2][w/2];
   DYN_ARRAY unsigned char t[w];
   /* note: 'out' array is never accessed out of bounds so it doesn't need
      a boundary policy */
   SET_ATTRIBUTE t->boundary_policy =
   ODD_REFLECT_AT_ALL_BOUNDARIES;
   SET_ATTRIBUTE src->boundary_policy =
   ODD_REFLECT_AT_ALL_BOUNDARIES;
   for (j = 0; j < h; j+ = 2)
     {
        /* vertical 121 filter, odd symmetric boundary policy extension
           of src */
        for (i = 0; i < w; i++)
          {
             t[i] = src[j-1][i] + 2 * src[j][i] + src[j+1][i];
          }
        /* horizontal 1,4,6,4,1 filter, odd symmetric boundary policy
           extension of t */
        for (i = 0; i < w; i += 2)
          {
             out[j/2][i/2] = t[i-2] + 4*t[i-1] + 6*t[i] + 4*t[i+1] + t[i+2];
          }
     }
}
```

TABLE 2

INTERFACE TO DYNAMIC ARRAY LIBRARIES

```
# include <studio.h>
# include "cache_dynamic_array.h"
# define DYN_CONVERT(x) x ## _
void Filter (char *src, char *out, int h, int w)
{
   dyn_array *src_ = NULL;
   dyn_array *out_ = NULL;
   dyn_array *t_ = NULL;
   int i, j, n;
   src_= Create_2d_((char *) src, h, w, w, "src", sizeof(unsigned char));
   Get_Cache_Array_Entry_(src_) --> unsigned_val = 1;
   out_= Create_2d_((char *) out, h>>1, w / 2, w / 2,
   "out", sizeof(unsigned char));
   Get_Cache_Array_Entry_(out_) --> unsigned_val = 1;
   t_= Create_Id_((NULL, w, "t", sizeof(unsigned char));
   Get_Cache_Array_Entry_(t_) --> unsigned_val = 1;
   Get_Cache_Array_Entry_(t_) --> index_policy =
   ODD_REFLECT_AT_ALL_BOUNDARIES;
   Get_Cache_Array_Entry_(src_) --> index_policy =
   ODD_REFLECT_AT_ALL_BOUNDARIES;
   for(j = 0; j <h; j += 2)
      { /* vertical 121 filter, symmetric extension of src */
         for (i = 0; i < w; i++)
            {
              n = (get2(src_, j-1, i)) + 2 * (get2(src_, j, i)) +
                 (get2(src_)), j+1, i));
              put1(t_,i, ((n + 2) / 4));
            }
         /* symmetric extension of t */
         for (i = 0; i < w; i += 2)
            {
              n = (get1(t_, i-2)) + 4 * (get1(t_, i-1)) +
                 6 * (get1(t_, i)) + 4 * (get1(t_,i + 1)) + (get1(t_, i+2));
              put2(out_, j/2, i/2, ((n + 8) / 16));
            }
      }
   Free_Overlay(t_);
   Free_Overlay(src_);
   Free_Overlay(out_);
}
```

TABLE 3

DYNAMIC ARRAY AND DYNAMIC OVERLAY EXTENSION GRAMMAR

Notes:
  (<item>)?    means 0 or 1 item.
  (<item>)*    means 0 or more items.
  <a> | <b>    accepts either item <a> or <b> in syntax.
text other than inside <> is literal.
C++ style comments are not part of extended syntax specification.
Additions to the list of standard C statements:
    // overlaying existing and usurping array to be an overlay handle
    DYN_OVERLAY <array_spec> (,<array_spec>)? ;    |
    // overlaying existing allocated memory and creating a new handle
    DYN_OVERLAY <array_spec> = <base_address> ;    |
    // creating a new dynamic array
    DYN_ARRAY <type_specifier> <array_spec> (,<array_spec>)? ; |
    // freeing existing dynamic arrays or dynamic overlays
    DYN_FREE <array_ident> (,<array_ident>)* ;    |
array_spec:
    <array_ident>[<int_height>] [<int_width>@<int_stride>]    |
    <array_ident>[<int_height>] [<int_width>]    |
    <array_ident>[<int_width>]
// setting array attributes
    DYN_SET_ATTRIBUTE <array_identifier> -> <l_attribute> =
    <expr> ;
    DYN_GET_ATTRIBUTE <lvalue> =
    <array_identifier> -> <r_attribute> ;
r_attribute:  default_val_outside_boundary | boundary_policy    |
    unsigned_val | element_size | width | height | stride    |
    base_address
l_attribute:  default_val_outside_boundary | boundary_policy    |
    unsigned_val TABLE 3-continued

DYNAMIC ARRAY AND DYNAMIC OVERLAY EXTENSION GRAMMAR

```
// expression values for attribute = boundary_policy
expr:
    ODD_REFLECT_AT_ALL_BOUNDARIES    |
    EVEN_REFLECT_AT_ALL_BOUNDARIES   |
    CONFINE_TO_BOUNDARY              |
    USE_DEFAULT_VAL_OUTSIDE_BOUNDARY |
    ABORT_OUTSIDE_BOUNDARY
```

The present subject matter provides a simplified source code that indexes into arrays using explicit boundary policies. The dynamic array and dynamic overlay language extensions provide a simple user interface for the most common array access problems such as those encountered in DSP applications, for example. The language extensions simplify the writing of array-based DSP code, and eliminate most pointer arithmetic and array bounds considerations for DSP applications. The language extensions allow support of various actions for indexing outside of the array boundary. Array index access of dynamically allocated data is simplified since dynamic overlays can impose a structure on any passed array. Including explicit boundary policies in array declarations eliminates the need for complicated and error-prone array boundary code. Dynamic overlays and dynamic arrays behave like automatic data storage, which helps avoid memory leaks, and makes the code simpler and easier to understand. Special hardware, such as boundary policy enforcement, index mapping, and a cached dynamic array (CDA) cache memory, may be used to offset the execution speed that may otherwise be lost using the language extensions of the present invention. The CDA cache memory takes advantage of the contiguous nature of cache addresses for the arrays by using speculative loading techniques to achieve very high cache hit rates.

Although specific embodiments have been illustrated and described herein, it will be appreciated by those of ordinary skill in the art that any arrangement that is calculated to achieve the same purpose may be substituted for the specific embodiment shown. This application is intended to cover any adaptations or variations of the present invention. It is to be understood that the above description, and example contained therein, is intended to be illustrative, and not restrictive. Combinations of the above embodiments, and other embodiments will be apparent to those of skill in the art upon reviewing the above description. The scope of the invention includes any other applications in which the above structures and fabrication methods are used. The scope of the invention should be determined with reference to the appended claims, along with the full scope of equivalents to which such claims are entitled.

What is claimed is:

1. A machine-implemented method, comprising:
compiling a program having a first reference to a set of memory locations associated with a one-dimensional array and a second reference to the same set of memory locations associated with a two or more dimensional overlay of the one-dimensional array, a number of dimensions and a size for the two or more dimensional overly defined as an expression in the compiled program and the expression evaluated during execution for an executable version of the compiled program; and
producing the executable version of the program that when executed by a machine permits calls using the first and second references to assess the same set of memory locations for purposes of storing and retrieving data from the same set of memory locations.

2. The method of claim 1, wherein compiling further includes accepting user-defined boundaries for the overlay and user-defined handling for those boundaries within the program and representing features associated with that in the executable version of the program.

3. The method of claim 1, wherein compiling further includes adding features to automatically remove the overlay when the executable version is executed by the machine and when access is attempted within the executable version to the second reference and when the access is outside a scope of a subroutine within which the overlay was defined within the program.

4. The method of claim 1, wherein compiling further includes adding features to provide dynamically determined attributes associated with the overlay when the executable version is executed by the machine.

5. The method of claim 1, wherein compiling further includes maintaining the set of memory locations as persistent within the executable version.

6. A machine-implemented method, comprising:
recognizing programming extensions within a programming language for defining multi-dimensional overlay views of existing defined and declared one-dimensional arrays, wherein a number of dimensions and size for the multi-dimensional overlay views are declared in source code of programs as an expression that is resolved when executable versions of compiled versions of the programs execute, wherein the programming extensions are recognized within the source code of programs written in the programming language;
and adding programming logic to be included with the compiled versions of the programs that implement the programming extensions, wherein the programming logic persists contiguous memory locations associated with the defined and declared one-dimensional arrays to be manipulated and referenced within the executable versions of the programs via references to the multi-dimensional overlay views.

7. The method of claim 6 further comprising, adding user-defined and developed array boundary policies within the compiled versions of the programs for processing in the executable versions when boundaries are exceeded from the multi-dimensional overlays.

8. The method of claim 6 further comprising, adding logic within the compiled versions of the programs that dynamically determine array information for the multi-dimensional overlays in the executable versions.

9. The method of claim 6 further comprising, processing the method within a compiler using a source code and programming extensions as input.

10. A system, comprising:
memory programmed with:
language extensions; and
a compiler, wherein the compiler is to compile source code having references to the language extension and the language extensions define within the source code a one-dimensional array and a multi-dimensional overlay view of the one-dimensional array, wherein a number of dimensions and size for the multi-dimensional overlay view declared in the source code as an expression that is resolved when an executable version of the compiled source code executes, and wherein the compiler treats references to the overlay as making access to memory locations associated with the one-dimensional array.

11. The system of claim 10 further comprising an executable version of the source code at least partially produced by the compiler.

12. The system of claim 10, wherein the language extension also include user-defined boundary policies representing exception processing for handling attempts to access data associated with being outside boundaries of the memory locations, and wherein the compiler incorporates the user-defined boundary policies within the executable version of the source code.

13. The system of claim 10 further comprising, a translator to produce machine code for a compiled version of the source code produced by the compiler.

14. A system, comprising:
a non-transitory machine readable medium;
an executable version of a program residing on the machine readable medium, wherein the program when executed by a machine includes processing that permits contiguous memory locations associated with a one-dimensional array to be overlaid and treated as a multi-dimensional array and that can be referenced as multiple dimensions, a number of dimensions and size for the multi-dimensional array declared in a source code for the program as an expression that is resolved when the executable version executes.

15. The system of claim 14, wherein the program when executed by a machine also includes processing that permits logic associated with user-defined boundary policies to be processed if the multi-dimensional array is referenced outside the contiguous memory locations.

16. The system of claim 14 further comprising, a compiler to compile a source code version of the program into, at least partially, the executable version.

17. The system of claim 16 further comprising, programming language extensions to be embedded within the source code version that are to be recognized by the compiler to permit the multi-dimensional array.

18. The system of claim 14, wherein an array handle is provided to reference the multiple dimensions.

19. The system of claim 14, wherein the program is written in an extended programming language.

20. The system of claim 19 further comprising a translator to translate the extended program language into machine code.

\* \* \* \* \*

UNITED STATES PATENT AND TRADEMARK OFFICE
CERTIFICATE OF CORRECTION

| | |
|---|---|
| PATENT NO. | : 8,782,621 B2 |
| APPLICATION NO. | : 13/615927 |
| DATED | : July 15, 2014 |
| INVENTOR(S) | : Keith R. Slavin et al. |

Page 1 of 1

It is certified that error appears in the above-identified patent and that said Letters Patent is hereby corrected as shown below:

In the Claims

In column 19, line 62, in Claim 1, delete "overly" and insert -- overlay --, therefor.

Signed and Sealed this
Thirteenth Day of January, 2015

Michelle K. Lee
*Deputy Director of the United States Patent and Trademark Office*